(12) United States Patent
Chen et al.

(10) Patent No.: US 12,208,376 B2
(45) Date of Patent: *Jan. 28, 2025

(54) METHOD FOR PREPARING SUPERCRITICAL FLUID BY DEEP-SEA PRESSURE

(71) Applicants: Tianjin University of Commerce, Tianjin (CN); Tianjin University, Tianjin (CN)

(72) Inventors: Guanyi Chen, Tianjin (CN); Junyu Tao, Tianjin (CN); Yadong Ge, Tianjin (CN); Beibei Yan, Tianjin (CN); Yunan Sun, Tianjin (CN); Zhanjun Cheng, Tianjin (CN); Jian Li, Tianjin (CN); Lan Mu, Tianjin (CN); Yongjie Hu, Tianjin (CN)

(73) Assignees: Tianjin University of Commerce, Tianjin (CN); Tianjin University, Tianjin (CN)

( * ) Notice: Subject to any disclaimer, the term of this patent is extended or adjusted under 35 U.S.C. 154(b) by 618 days.

This patent is subject to a terminal disclaimer.

(21) Appl. No.: 17/550,418

(22) Filed: Dec. 14, 2021

(65) Prior Publication Data
US 2023/0149873 A1    May 18, 2023

(30) Foreign Application Priority Data
Nov. 17, 2021 (CN) .......................... 202111364000.6

(51) Int. Cl.
*B01J 3/00*   (2006.01)
*B01J 3/06*   (2006.01)
*C01B 32/50*  (2017.01)

(52) U.S. Cl.
CPC ............... *B01J 3/008* (2013.01); *B01J 3/002* (2013.01); *B01J 3/006* (2013.01); *B01J 3/06* (2013.01); *C01B 32/50* (2017.08); *Y02P 20/54* (2015.11)

(58) Field of Classification Search
CPC ... B01J 3/008; B01J 3/002; B01J 3/006; B01J 3/06; C01B 32/50; Y02P 20/54
See application file for complete search history.

(56) References Cited

FOREIGN PATENT DOCUMENTS

JP    2000157859 A   *  6/2000

OTHER PUBLICATIONS

English translation of JP-2000157859A (Year: 2000).*

* cited by examiner

*Primary Examiner* — Samir Shah
*Assistant Examiner* — Gail Boardman

(57) ABSTRACT

A method for preparing a supercritical fluid by deep-sea pressure is provided and belongs to the technical field of supercritical fluid preparation. The method includes the following steps of: placing a low-pressure fluid in a closed flexible container, sending the closed flexible container down to a location of a sea at a depth where a seawater pressure meets a requirement by using a powered or unpowered traction device, leaving the flexible container standing still until a volume of the flexible container does not change, wrapping the closed flexible container with a rigid pressure-bearing container, transferring the closed flexible container to the sea surface by the powered or unpowered traction device, and taking out the fluid in the flexible container as supercritical fluid. Then the supercritical fluid is produced. Therefore, the process of preparing supercritical (high pressure) liquid in the deep-sea is safer and more stable than the preparation way on land.

6 Claims, No Drawings

METHOD FOR PREPARING SUPERCRITICAL FLUID BY DEEP-SEA PRESSURE

TECHNICAL FIELD

The invention relates to the technical field of supercritical fluid preparation, in particular to a method for preparing supercritical fluid by deep-sea pressure.

BACKGROUND

High pressure is an important way to reduce the volume of fluid and the transportation cost of fluid, such as high-pressure gas cylinders, liquefied natural gas, liquefied petroleum gas and so on, which is extensively applied. Moreover, when the temperature and pressure of the fluid both exceed the critical point, the fluid is under the supercritical state. Supercritical fluid includes but is not limited to supercritical water, supercritical carbon dioxide, etc. Because of unique physical and chemical characteristics, supercritical fluid has been widely applied in many industries such as chemical industry, smelting industry and food industry. At present, in order to prepare supercritical fluid, mechanical extruding and high-pressure pumping are mainly adopted in the industry. However, these ways mainly have two problems:
(1) the energy consumed to reach the high-pressure condition is considerable, so energy consumption cost is high;
(2) it is difficult to guarantee safe high-pressure forming process, and dangers may occur.

SUMMARY

At present, the supercritical fluid is mainly prepared with compressors to raises the pressure of low-pressure gas to supercritical state. However, there is a high risk when the compressor is running or operating under pressure in the laboratory, and there are high requirements for experimenters' operation and safety factors of equipment. When the supercritical fluid is prepared by using deep-sea pressure, the preparation environment is similar to a closed space, and the deep-sea pressure is in a stable state, so the safety factor and stability factor of the supercritical fluid are relatively high.

In addition, when a compressor is used to prepare supercritical fluid, it needs to consume high kinetic energy to compress the fluid, and therefore consume a lot of energy. However, in the invention, when supercritical fluid is prepared by deep-sea pressure, heavy objects may be bundled to realize underwater traction of the fluid and hence reduce energy consumption.

To achieve the above objective, the invention provides the following scheme:

A method for preparing supercritical fluid by deep-sea pressure includes the following steps: placing low-pressure fluid in a closed flexible container, sending the closed flexible container to a location of a sea at a depth where a seawater pressure meets a requirement by using a powered or unpowered traction device, leaving the flexible container standing until a volume of the flexible container does not change, wrapping the closed flexible container around with a rigid pressure-bearing container, transferring the closed flexible container after the wrapping to the sea surface by using a powered or unpowered traction device, and taking out the fluid in the flexible container, which is the supercritical fluid.

Furthermore, the materials of the flexible container include but are not limited to rubber, latex, spring steel, etc., and pressure-bearing capacity of the flexible container is not less than the pressure of the supercritical fluid.

Furthermore, a formula for calculating the depth is $h = P \times 10^6 \div \rho_{seawater} \div g$, where h is the depth (m), p is the critical pressure (MPa), $\rho_{seawater}$ is the seawater density (kg/m$^3$), and g is the gravitational acceleration (m/s$^2$).

Furthermore, the duration for the standing still is in a range from 0.5 hours (h) to 1 h.

Furthermore, the rigid pressure-bearing container is an openable and closable structure.

Furthermore, when the unpowered traction device is used for the sending, it is realized by binding heavy objects outside the rigid pressure-bearing container.

The technical key of the invention lies in that the flexible container is used to wrap the low-pressure fluid which is dragged to the deep sea, the rigid container with open-close structure (i.e., is an openable and closable structure) wraps outside the flexible container, the flexible container is tightly wrapped in the deep sea, and the nested rigid container and flexible container are transported to the sea surface to obtain the supercritical fluid. The methods of towing flexible container to the deep sea or transporting nested rigid container and flexible container to the sea surface include: an unpowered traction method such as gravity traction (for example, flexible container is bound with heavy objects), and a powered traction method such as diving machine traction or mechanical telescopic rod traction.

The invention can achieve the following technical effects:
(1) because the process of reaching supercritical (high pressure) happens in seawater, the safety and stability are better than those of the method of preparing high pressure fluid on land;
(2) the energy consumption of high-pressure fluid preparation is significantly reduced. When the flexible container reaches the deep-sea by unpowered traction (for example, the flexible container is tied with heavy objects), and a finally obtained density of high-pressure fluid is less than that of seawater, there is theoretically no energy consumption in the high-pressure fluid preparation process.

DETAILED DESCRIPTION OF EMBODIMENTS

Various exemplary embodiments of the invention will be described in detail. This detailed description should not be considered as a limitation of the invention, but should be understood as a more detailed description of some aspects, characteristics and embodiments of the invention.

It should be understood that the terms used in this invention are only for describing specific embodiments, and are not used to limit the invention. In addition, for the numerical range in the invention, it should be understood that each intermediate value between the upper limit and the lower limit of the range is also specifically disclosed. Any stated value or intermediate value within the stated range and any other stated value or every smaller range between intermediate values within the stated range are also included in the invention. The upper and lower limits of these smaller ranges can be independently included or excluded from the range.

Unless otherwise specified, all technical and scientific terms used herein have the same meaning as commonly understood by the ordinary technicians in the field of this invention. Although the invention only describes the preferred methods and materials, any methods and materials similar or equivalent to those described herein can also be used in the practice or testing of the invention. All documents mentioned in this specification are incorporated by reference to disclose and describe the methods and/or materials related to the documents. In case of conflict with any incorporated documents, the contents of this specification shall prevail.

Without departing from the scope or spirit of the invention, it is apparent to those skilled in the art that many modifications and changes can be made to the specific embodiments of the invention. Other embodiments obtained from the specification of the invention will be apparent to those skilled persons. The description and embodiments of the invention are exemplary only.

The words "including", "comprising", "having" and "containing" used in the specification are all open terms, i.e., they mean including but not limited to.

A container whose deformability under the pressure inside the container is much smaller than that under the pressure outside the container can be regarded as the nested rigid container and flexible container described in the invention.

In an exemplary embodiment of this invention, the density of seawater is $1.02 \times 10^3$ kg/m$^3$ and the acceleration of gravity is 9.8 m/s$^2$.

In the following embodiments, the process of wrapping the flexible container with the rigid container can be realized by remote control of a remote controller. At present, there are over 5000 m ultra-long-distance remote control devices on the market, and the open-close (i.e., openable and closable) rigid container of the invention can be purchased.

According to an illustrated embodiment of the invention, the waste under gravity traction can be released to the seabed by remote control during the opening and closing process of the rigid container. It can also be towed out of the sea with power traction.

In the illustrated embodiment of the invention, $P_1$ refers to the critical pressure of supercritical fluid.

In the illustrated embodiment of the invention, the flexible container is wrapped by the open-close rigid container, which is in an open state before launching. After the volume of the flexible container is compressed in the deep sea (staying at the specified depth for 0.5-1 h), the open-close rigid container is wrapped on the outer surface of the compressed flexible container under the control of an ultra-long-distance remote control device, and then the flexible container is pulled out up to the sea surface.

In the illustrated embodiment of the invention, the wastes settled by gravity include the nuclear wastes that cannot be utilized (in line with the requirements of the nuclear waste marine burial law), wastes used for reclamation and land reclamation (such as cement), etc. After reaching the specified depth, the heavy objects can be put in under the control of the remote control, and then the container containing supercritical fluid is pulled out of the sea surface by a tractor, which not only realizes the waste treatment, but also successfully prepares the supercritical fluid.

Embodiment 1, Preparation of Supercritical CO$_2$ Fluid by Deep-Sea Pressure

The critical pressure of supercritical CO$_2$ fluid is 7.38 MPa. CO$_2$ fluid under normal pressure is filled into a high-pressure resistant flexible container made of rubber (density is 1.6 g/cm$^3$) with a volume of 1 m$^3$ (pressure-bearing capacity is higher than 7.38 MPa), and an open-close aluminum alloy rigid container with a volume of 0.013 m$^3$ after sealing is loaded on the flexible container, and the flexible container is put into the deep-sea at a depth of about 738 m (the formula is $h = P \times 10^6 \div \rho_{seawater} \div g = 7.38 \times 10^6 \div (1.02 \times 10^3) = 9.8 = 738.3$ m) under the traction of 1.5 tons waste (waste that does not pollute seawater, such as building material waste cement). In 0.5 hours, the volume of the flexible container is compressed under the deep-sea pressure, and the fluid pressure inside the flexible container reaches the required high pressure $P_1 = 7.38$ MPa. At this pressure, the volume of the flexible container is compressed to 0.0012 m$^3$. At this time, the open-close aluminum alloy rigid container wraps outside the compressed flexible container under the control of the ultra-long-distance remote control device, and the fluid in the flexible container is pulled out to the sea surface by the tractor and taken out by valves, etc. The result shows that the supercritical CO$_2$ of 0.0012 m$^3$ is finally obtained.

Embodiment 2, Preparation of Supercritical Water by Deep-Sea Pressure

The critical pressure of supercritical water is 22.1 MPa. 0.8 m$^3$ of purified water under normal pressure is filled into the high-pressure resistant flexible container made of latex (density is 1.6 g/cm$^3$) with a volume of 1 m$^3$ (pressure bearing capacity is higher than 22.1 MPa), and an open-close aluminum alloy rigid container with a volume of 0.005 m$^3$ after sealing is loaded on the flexible container, and the flexible container is put into the deep sea at a depth of about 2211 m (the formula is $h = P \times 10^6 \div \rho_{seawater} \div g = 22.1 \times 10^6 \div (1.02 \times 10^3) \div 9.8 = 2210.898$ m) under the traction of 3 tons waste (waste that does not pollute seawater, such as building material waste cement). The volume of the flexible container is compressed under the deep-sea pressure for 0.5 h, and the fluid pressure inside the flexible container reaches the required high pressure $P_1 = 22.1$ MPa. At this pressure, the volume of the flexible container is compressed to 0.004 m$^3$. At this time, the open-close aluminum alloy rigid container wraps outside the compressed flexible container under the control of the ultra-long-distance remote control device, and the fluid in the flexible container is pulled out to the sea surface by the tractor and taken out by valves, etc. The result shows that the supercritical water of 0.004 m$^3$ is finally obtained.

The above-mentioned embodiments only describe preferred modes of the invention, and do not limit the scope of the invention. Without departing from the design spirit of the invention, all kinds of modifications and improvements made by ordinary technicians in the field to the technical scheme of the invention should fall within the protection scope defined by the appended claims of the invention.

What is claimed is:

1. A method for preparing supercritical fluid by deep-sea pressure, comprising:
    placing a low-pressure fluid in a closed flexible container,
    sending the closed flexible container down to a location of a sea at a depth where a seawater pressure meets a requirement by a powered or unpowered traction device, leaving the closed flexible container standing still until a volume of the flexible container is no longer changed,
    wrapping around the closed flexible container with a rigid pressure-bearing container,
    transporting the closed flexible container after the wrapping to the sea surface by a powered or unpowered traction device, and
    taking out the low-pressure fluid in the flexible container after the transporting, wherein the low-pressure fluid at this time is supercritical fluid having a pressure higher than that of the low-pressure fluid.

2. The method for preparing supercritical fluid by deep-sea pressure according to claim 1, wherein a material of the flexible container comprises a rubber, a latex or a spring steel; and a pressure-bearing capacity of the flexible container is not less than the pressure of the supercritical fluid.

3. The method for preparing supercritical fluid by deep-sea pressure according to claim 1, wherein a formula for calculating the depth is $h = P \times 10^6 \div \rho_{seawater} \div g$, where h is the depth with a unit of meter (m), P is a critical pressure with a unit of megapascal (MPa), $\rho_{seawater}$ is a density of the seawater with a unit of kilogram per cubic meter (kg/m3), and g is a gravitational acceleration with a unit of meter per second squared (m/s$^2$).

4. The method for preparing supercritical fluid by deep-sea pressure according to claim 1, wherein a duration for the standing still is in a range of 0.5-1 hour (h).

5. The method for preparing supercritical fluid by deep-sea pressure according to claim 1, wherein the rigid pressure-bearing container is an openable and closable structure.

6. The method for preparing supercritical fluid by deep-sea pressure according to claim 1, wherein heavy objects are bound outside the rigid pressure-bearing container when the unpowered traction device is used for the sending.

* * * * *